United States Patent
Ukita et al.

(10) Patent No.: US 12,455,419 B2
(45) Date of Patent: Oct. 28, 2025

(54) OPTICAL FIBER CONNECTING JIG AND OPTICAL CONNECTOR

(71) Applicants: NIPPON TSUSHIN DENZAI CO., LTD., Komaki (JP); SUMITOMO ELECTRIC INDUSTRIES, LTD., Osaka (JP)

(72) Inventors: Yoshio Ukita, Komaki (JP); Tsuyoshi Imaizumi, Osaka (JP)

(73) Assignees: NIPPON TSUSHIN DENZAI CO., LTD., Komaki (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 296 days.

(21) Appl. No.: 18/020,171

(22) PCT Filed: Aug. 30, 2021

(86) PCT No.: PCT/JP2021/031752
§ 371 (c)(1),
(2) Date: Feb. 7, 2023

(87) PCT Pub. No.: WO2022/050224
PCT Pub. Date: Mar. 10, 2022

(65) Prior Publication Data
US 2023/0314729 A1    Oct. 5, 2023

(30) Foreign Application Priority Data

Sep. 4, 2020  (JP) .................................. 2020-148895

(51) Int. Cl.
*G02B 6/38* (2006.01)
*G02B 6/32* (2006.01)

(52) U.S. Cl.
CPC ............. *G02B 6/3898* (2013.01); *G02B 6/32* (2013.01); *G02B 6/3887* (2013.01); *G02B 6/3846* (2013.01)

(58) Field of Classification Search
None
See application file for complete search history.

(56) References Cited

U.S. PATENT DOCUMENTS 5,761,360 A * 6/1998 Grois .................. G02B 6/3806
                                                      385/136
7,346,255 B2 * 3/2008 Yamaguchi .......... G02B 6/3807
                                                      385/136
(Continued)

FOREIGN PATENT DOCUMENTS

JP      2006-139212 A      6/2006
JP      2007-121886 A      5/2007
(Continued)

OTHER PUBLICATIONS

Nov. 22, 2021 Search Report issued in International Patent Application No. PCT/JP2021/031752.

*Primary Examiner* — Jerry Rahll
(74) *Attorney, Agent, or Firm* — Oliff PLC

(57) ABSTRACT

An optical fiber connecting jig according to one embodiment includes: a plate-shaped base mounted on the optical connector so as to cover the optical connector; a wedge portion protruding from the base and inserted into a mechanical splice; an operation portion provided respectively on both sides of the base in a width direction and protruding in the width direction from the optical connector; a pair of first engagement portions provided respectively on both sides of the base in the width direction on one side of the base in a longitudinal direction and protruding toward the optical connector; and a pair of second engagement portions provided respectively on both sides of the base in the width
(Continued)

direction on the other side of the base in the longitudinal direction and protruding toward the optical connector.

7 Claims, 10 Drawing Sheets

(56) References Cited

U.S. PATENT DOCUMENTS

| | | | | |
|---|---|---|---|---|
| 7,712,974 | B2* | 5/2010 | Yazaki | G02B 6/3846 |
| | | | | 385/98 |
| 8,111,967 | B2* | 2/2012 | Dobbins | G02B 6/3806 |
| | | | | 385/99 |
| 8,118,495 | B2* | 2/2012 | Yazaki | G02B 6/3846 |
| | | | | 385/86 |
| 10,139,568 | B2* | 11/2018 | Yamaguchi | G02B 6/3806 |
| 2006/0104590 | A1 | 5/2006 | Yamaguchi et al. | |
| 2011/0119904 | A1 | 5/2011 | Nishioka et al. | |
| 2020/0264381 | A1 | 8/2020 | Hu et al. | |
| 2023/0314729 | A1* | 10/2023 | Ukita | G02B 6/32 |
| | | | | 385/134 |

FOREIGN PATENT DOCUMENTS

| | | |
|---|---|---|
| JP | 2010-061121 A | 3/2010 |
| JP | 2011-027760 A | 2/2011 |
| JP | 2015-515028 A | 5/2015 |
| JP | 2018-163303 A | 10/2018 |
| WO | 2011/011209 A2 | 1/2011 |
| WO | 2013/159331 A1 | 10/2013 |

* cited by examiner

OPTICAL FIBER CONNECTING JIG AND OPTICAL CONNECTOR

TECHNICAL FIELD

The present disclosure relates to optical fiber connecting jigs and optical connectors.

This application claims priority based on Japanese Patent Application No. 2020-148895 dated Sep. 4, 2020, the entire contents of which are incorporated herein by reference.

BACKGROUND ART

Patent Literature 1 discloses a mechanical splice type optical connector and an optical connector jig. The optical connector has a capillary containing a short optical fiber. The capillary is provided with a V-groove substrate and a pressing lid side by side. The V-groove substrate and the pressing lid are sandwiched by a U-shaped clamp spring. A slit-shaped wedge insertion hole is formed in the V-groove substrate and the pressing lid.

The optical connector jig has a convex wedge on the lower face of a wedge plate portion. When the wedge is inserted into the wedge insertion hole, the V-groove substrate and the presser lid are separated from each other, so that the optical fiber is in an insertable state. The optical connector jig includes a pair of arms protruding from the wedge plate portion, a pair of struts, and a lock portion. Each of the pair of struts is engaged with the optical connector, and the lock portion restricts the pair of arms to approach each other.

Patent Literature 2 discloses an optical connector tool and an optical connector attached with a tool. The optical connector tool includes a connector holder portion, an insertion member driving portion, and an insertion member. The connector holder portion is fitted to the outside of the optical connector. The insertion member driving portion has a ring shape into which the connector holder portion is incorporated. The insertion member protrudes from the insertion member driving portion and is inserted into the optical connector held by the connector holder portion. The insertion member is pulled out from the optical connector by applying a lateral pressure to the ring-shaped insertion member driving portion.

Patent Literature 3 discloses an optical fiber connecting tool and an optical connector attached with an optical fiber connecting tool. The optical fiber connecting tool includes an insertion portion for opening and closing a clamp portion of the optical connector, a pair of arms for holding the optical connector, and an interposition portion into which a convex portion formed on the outside of the optical connector is interposed. The arm has a holding portion holding the optical connector and a driving unit extracting the insertion portion from the clamp portion. When the driving unit extracts the insertion portion, the holding portion releases the holding of the optical connector in conjunction with the driving unit.

Patent Literature 4 discloses an optical fiber connecting jig used when connecting an optical fiber to a mechanical splice type optical connector. The optical fiber connecting jig includes a substantially rectangular parallelepiped base and a rotating arm. A connector mounting portion on which an optical connector plug is mounted and a fiber guide portion for guiding an optical fiber element wire are provided on the upper face of the base. A pair of wedges are provided on the upper face of the rotating arm. The wedge is inserted into a wedge insertion opening provided at the bottom portion of the mechanical splice, and the fiber insertion space of the mechanical splice is in an opened state. The rotating arm has an operation portion, and by the operation of the operation portion, the rotating arm is rotated to pull out the wedge from the wedge insertion opening.

CITATION LIST

Patent Literature

Patent Literature 1: Japanese Unexamined Patent Publication No. 2010-061121
Patent Literature 2: Japanese Unexamined Patent Publication No. 2006-139212
Patent Literature 3: Japanese Unexamined Patent Publication No. 2018-163303
Patent Literature 4: Japanese Unexamined Patent Publication No. 2007-121886

SUMMARY OF INVENTION

An optical fiber connecting jig according to one aspect of the present disclosure is an optical fiber connecting jig used in an optical connector having a mechanical splice connecting an optical fiber and a built-in fiber to each other. The optical fiber connecting jig includes: a plate-shaped base extending in a direction of extension of the optical fiber and the built-in fiber and mounted on the optical connector so as to cover the optical connector; a wedge portion protruding from the base and inserted into the mechanical splice; operation portions provided respectively on both sides of the base in a width direction and protruding in the width direction from the optical connector; a pair of first engagement portions provided respectively on both sides of the base in the width direction on one side of the base in the longitudinal direction and protruding toward the optical connector; and a pair of second engagement portions provided respectively on both sides of the base in the width direction on the other side of the base in the longitudinal direction and protruding toward the optical connector.

An optical connector according to one aspect of the present disclosure includes the optical fiber connecting jig and the mechanical splice described above, and a wedge portion of the optical fiber connecting jig is inserted into the mechanical splice.

DESCRIPTION OF EMBODIMENTS

Figure 1:
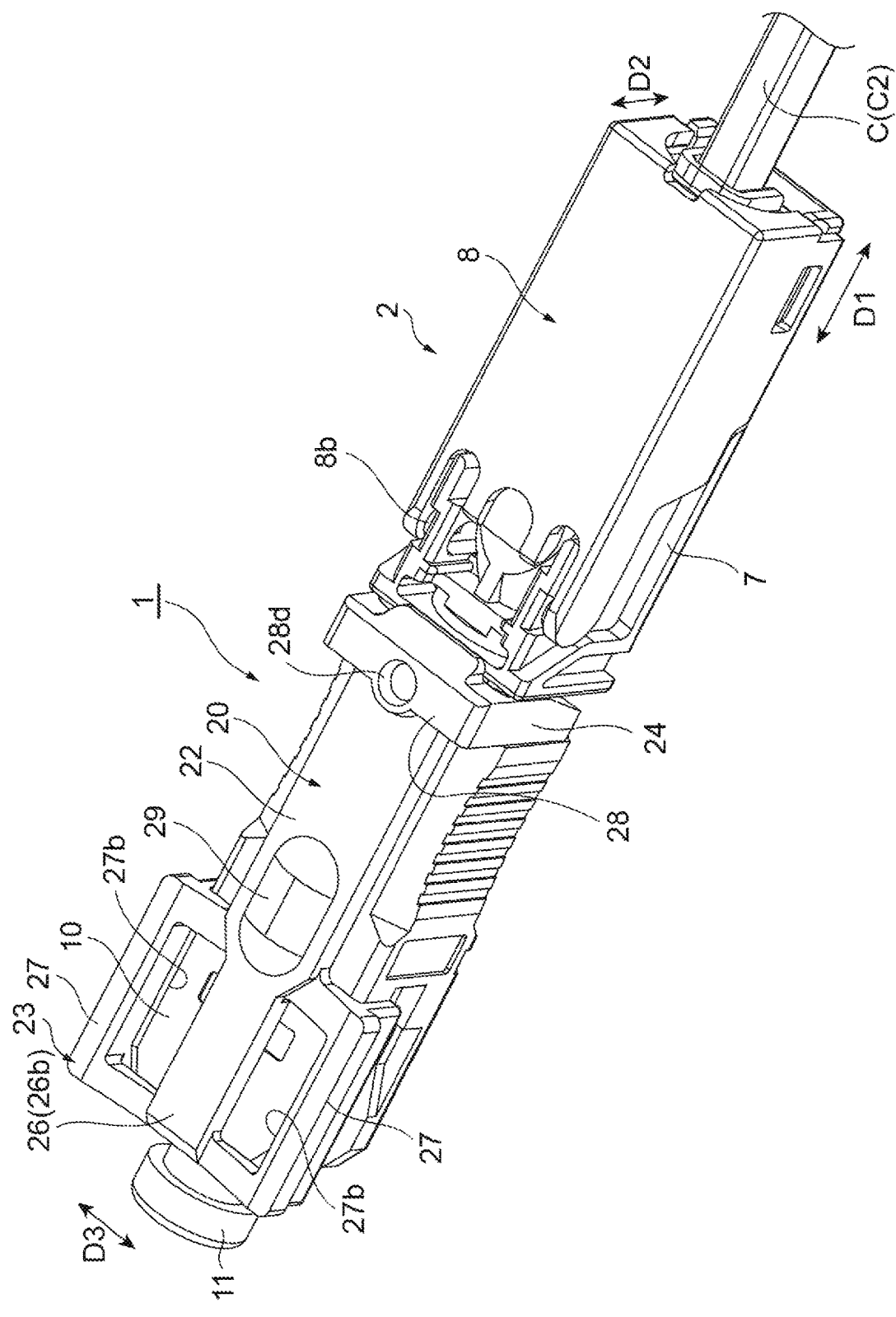
FIG. 1 is a perspective view illustrating an optical fiber connecting jig and an optical connector according to an embodiment.

By the way, in a case where an optical fiber connecting jig is attached to the optical connector, when the optical fiber connecting jig does not have a function of preventing falling off from the optical connector, there is a concern that the optical fiber connecting jig may fall off due to vibrations, impacts, or the like when the optical connector is transported. On the other hand, the above-described optical fiber connecting jig having a wedge may have a separate component for preventing the optical fiber from falling off from the optical connector. In this case, since the wedge is required to be removed after releasing the separate component, a work of two actions is required until the wedge is removed. Therefore, there is room for improvement in the operability of the operation of removing the wedge.

The present disclosure provides an optical fiber connecting jig and an optical connector capable of suppressing the optical fiber connecting jig from falling off from an optical connector and improving operability when removing the optical fiber connecting jig from the optical connector.

Description of Embodiments of the Present Disclosure

First, contents of embodiments of the present disclosure will be listed and described. An optical fiber connecting jig according to one embodiment is an optical fiber connecting jig used in an optical connector having a mechanical splice for connecting an optical fiber and a built-in fiber to each other. The optical fiber connecting jig includes: a plate-shaped base extending in a direction of extension of the optical fiber and the built-in fiber and mounted on the optical connector so as to cover the optical connector; a wedge portion protruding from the base and inserted into the mechanical splice; operation portions provided respectively on both sides of the base in a width direction and protruding in the width direction from the optical connector; a pair of first engagement portions provided respectively on both sides of the base in the width direction on one side of the base in the longitudinal direction and protruding toward the optical connector; and a pair of second engagement portions provided respectively on both sides of the base in the width direction on the other side of the base in the longitudinal direction and protruding toward the optical connector.

This optical fiber connecting jig includes: a pair of first engagement portions provided respectively on both sides of the base in the width direction on one side of the base in the longitudinal direction; and second engagement portions provided respectively on both sides of the base in the width direction on the other side of the base in the longitudinal direction. Therefore, since the optical connector is engaged with the optical connector respectively on one side and the other side of the base in the longitudinal direction and on one side and the other side of the base in the width direction, the optical fiber connecting jig can be prevented from falling off from the optical connector. Even when vibrations, impacts, or the like are applied due to engagement of each of the four engagement portions of the optical fiber connecting jig with the optical connector, the optical fiber connecting jig can be allowed not to be likely to fall off. This optical fiber connecting jig includes an operation portion protruding to both sides in the width direction from the optical connector. Therefore, the optical fiber connecting jig can be removed in one action by performing the operation of picking the operation portions protruding on both sides in the width direction and pulling up the optical fiber connecting jig from the optical connector. Therefore, the operability of the operation of removing the optical fiber connecting jig can be improved.

Each of the pair of first engagement portions may be engaged with an inner housing accommodating the mechanical splice. Each of the pair of second engagement portions may be engaged with the outer housing accommodating the inner housing. In this case, the portion of the optical connector with which the first engagement portion is engaged can be allowed to be different from the portion of the optical connector with which the second engagement portion is engaged.

The height of both ends of the operation portion in the width direction relative to the base may be larger than the height of the central portion of the operation portion in the width direction relative to the base. In this case, since the height of the pair of both ends of the operation portion is larger than the height of the central portion, the operation portion can be easily pulled up by picking the pair of both ends. Therefore, the operability of pulling out the optical fiber connecting jig can be further improved.

The operation portion may be located in a portion of the base portion near the connecting portion where the optical fiber and the built-in fiber are connected to each other. In this case, the operation portion is provided at a position near the connecting portion. Therefore, when the optical fiber connecting jig is pulled up from the optical connector by the operation portion, the connection between the optical fiber and the built-in fiber can be performed immediately at the connecting portion. Therefore, the connection between the optical fiber and the built-in fiber can be performed in advance.

At least portion of the base and the wedge portion may be made of a transparent resin. In this case, the optical connector can be visually recognized through the base and the wedge portion. As a result, the connection state of the optical fiber and the built-in fiber can be confirmed by the light leaked from the connection point.

The optical fiber connecting jig described above may include a convex lens protruding from the base to the opposite side of the wedge portion. In this case, since the light leaked from the connection point between the optical fiber and the built-in fiber can be magnified by the convex lens, the confirmation of the connection state can be more easily performed.

An optical connector according to one embodiment may include the optical fiber connecting jig and the mechanical splice described above, and the wedge portion of the optical fiber connecting jig may be inserted into the mechanical splice. In this case, since the optical fiber connecting jig is attached to the optical connector, it may not be required to provide the optical fiber connecting jig at the site of the connection work. Therefore, the connection work for the optical fiber to the optical connector 1 can be more easily performed.

Details of the Embodiments of the Present Disclosure

A specific example of an optical fiber connecting jig and an optical connector according to an embodiment will be described below with reference to the drawings. It is noted that the present invention is not limited to the examples described later, but is intended to include all modifications indicated in the scope of the claims and within the scope of equivalents to the scope of the claims. In the description of the drawings, the same or corresponding elements are denoted by the same reference numerals, and redundant descriptions are omitted as appropriate. In some cases, the drawings may be partially simplified or exaggerated for the ease of understanding, and dimensional ratio and the like are not limited to those illustrated in the drawings.

Figure 2:
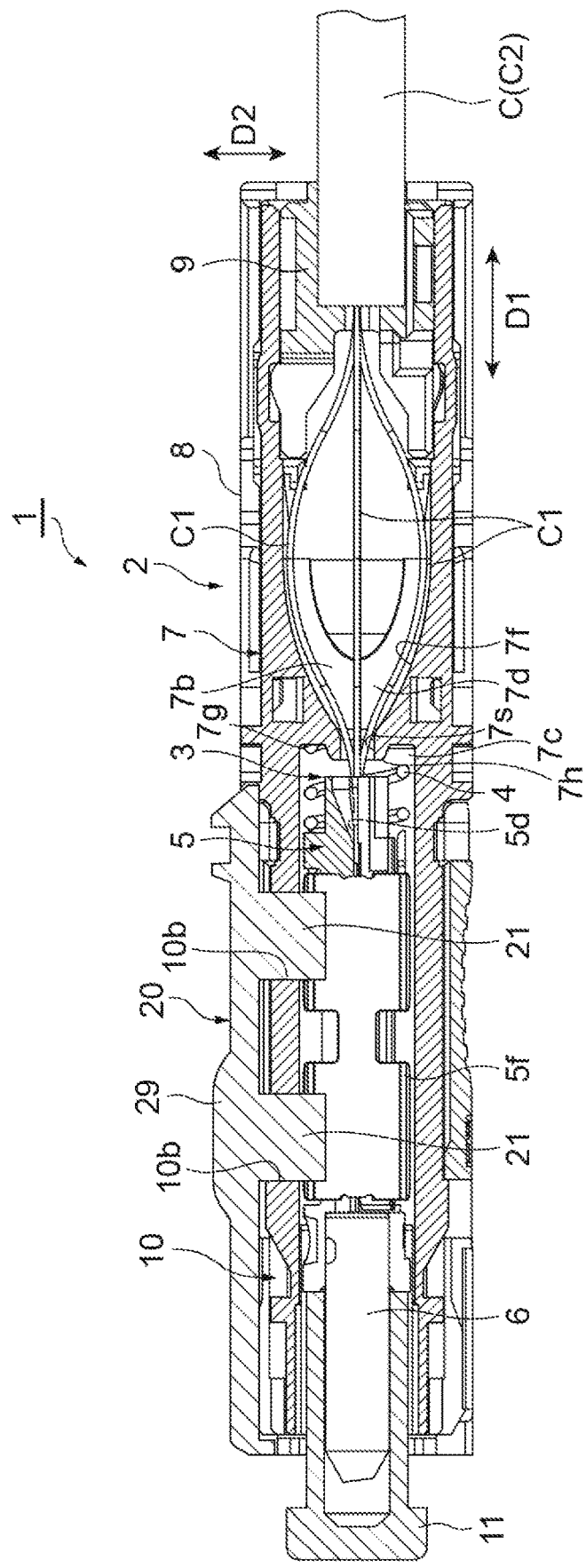
FIG. 2 is a cross-sectional view illustrating the optical fiber connecting jig and the optical connector of FIG. 1.

FIG. 1 is a perspective view illustrating an example of optical connector 1 according to an embodiment. FIG. 2 is a longitudinal cross-sectional view of the optical connector 1 of FIG. 1. As illustrated in FIGS. 1 and 2, the optical connector 1 according to the present embodiment includes, for example, a connector main body 2, an optical fiber connecting portion 3 incorporated in the connector main body 2, a spring 4 arranged inside the connector main body 2, and an outer housing 10 (hereinafter also referred to as a "knob") covering the connector main body 2.

The optical fiber connecting portion 3 has, for example, a mechanical splice 5 and a ferrule 6 attached to the mechanical splice 5. Hereinafter, the direction in which the ferrule 6 is provided as viewed from the mechanical splice 5 may be described as "front", "front side" and "forward", and the opposite direction as "rear", "rear side" and "rearward". However, these directions are for the convenience of description and do not limit the positions or arrangement aspects of components.

The optical connector 1 has, for example, a long shape extending along an optical cable C. The connector main body 2 includes, for example, an inner housing 7 extending along a longitudinal direction D1 of the optical connector 1 and a rear cover 8 covering the inner housing 7. Hereinafter, the direction in which the rear cover 8 is provided with respect to the inner housing 7 may be described as "above", "upper side", and "upward", and the opposite direction as "below", "lower side", and "downward". In addition, the direction in which the inner housing 7 and the rear cover 8 are aligned side by side is described as a height direction D2, and the direction perpendicular to both the longitudinal direction D1 and the height direction D2 is described as a width direction D3. However, these directions do not limit the positions or arrangement aspects of the components.

As an example, the optical connector 1 is an on-site-provided type optical connector. For example, the optical connector 1 is connected to the optical cable C having an optical fiber C1 at the site of connection work. The optical cable C includes, for example, the optical fiber C1 having an optical fiber core wire and an outer sheath C2 covering the optical fiber C1. The connector main body 2 includes, for example, an outer sheath fixing portion 9 accommodated between the inner housing 7 and the rear cover 8. The outer sheath C2 of the optical cable C is fixed to the outer sheath fixing portion 9. The rear cover 8 is rotatable with respect to the inner housing 7 via, for example, a shaft portion 8b. The shaft portion 8b is located at the front end of the rear cover 8 and extends in the width direction D3.

The optical fiber C1 of the optical cable C extends from the outer sheath fixing portion 9 through an internal space 7b of the inner housing 7 to the inside of the mechanical splice 5. The optical fiber C1 is bent in one of the height direction D2 and the width direction D3 in the internal space 7b of the inner housing 7. The shape of the internal space 7b viewed along the height direction D2 and the shape of the internal space 7b viewed along the width direction D3 are, for example, arc-shaped.

The inner housing 7 has a connecting portion accommodation portion 7c accommodating the optical fiber connecting portion 3 and a guide portion 7d guiding the optical fiber C1 extending from the optical cable C. The inner housing 7 is, for example, integrally configured with a resin and has no seams. The spring 4, the mechanical splice 5, and the ferrule 6 are accommodated in the connecting portion accommodation portion 7c. For example, the ferrule 6 is detachably provided with a ferrule cap 11 sealing the ferrule 6 from the opposite side of the mechanical splice 5. The guide portion 7d has a curved face 7f facing the bent optical fiber C1. The internal space 7b of the inner housing 7 described above is defined by the curved face 7f.

Figure 3:
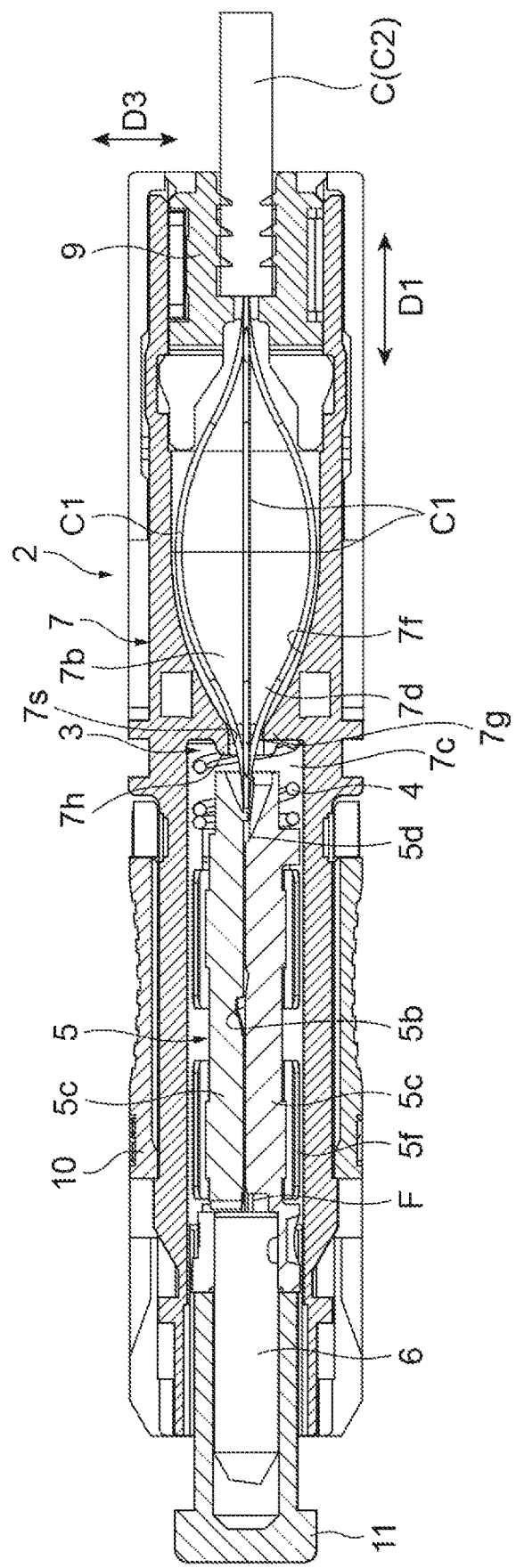
FIG. 3 is a cross-sectional view illustrating the optical fiber connecting jig and the optical connector of FIG. 1 different from FIG. 2.

FIG. 2 is a cross-sectional view of the optical connector 1 cut along a plane extending in the longitudinal direction D1 and the height direction D2. FIG. 3 is a cross-sectional view of the optical connector 1 cut along a plane extending in the longitudinal direction D1 and the width direction D3. As illustrated in FIGS. 1 to 3, the mechanical splice 5 is accommodated in the outer housing 10.

A through-hole 10b is formed in the outer housing 10. A wedge portion 21 of an optical fiber connecting jig 20 for press-expanding an optical fiber arrangement space 5b of the mechanical splice 5 is inserted into the through-hole 10b. The outer housing 10 has, for example, the two through-holes 10b aligned side by side along the longitudinal direction D1, and the wedge portion 21 is inserted through the respective through-holes 10b. The outer housing 10 has, for example, the two through-holes 10b aligned side by side along the longitudinal direction D1, and the wedge portion 21 is inserted through the respective through-holes 10b. The optical fiber connecting jig 20 will be described in detail later.

The mechanical splice 5 has a pair of holding members 5c, a V-groove 5d, and a clamp 5f. The pair of holding members 5c are aligned side by side along the width direction D3. The V-groove 5d defines the optical fiber arrangement space 5b formed between the pair of holding members 5c. The clamp 5f is a spring member biasing the pair of holding members 5c in a direction to close the optical fiber arrangement space 5b. The internal space 7b extending from the V-groove 5d to the outer sheath fixing portion 9 serves as a bending region for the optical fiber C1. The inner housing 7 includes a partition wall 7g partitioning the connecting portion accommodation portion 7c and the guide portion 7d. The partition wall 7g has a cylindrical protrusion 7h protruding to the connecting portion accommodation portion 7c. The protrusion 7h protrudes to the opposite side of the guide portion 7d. Due to the protrusion 7h, the internal space 7b, which is the bending region of the optical fiber C1, is extended toward the connecting portion accommodation portion 7c side.

The mechanical splice 5 is arranged to be separated from the partition wall 7g toward the ferrule 6 side. A portion of the spring 4 is arranged to surround the protrusion 7h. The spring 4 is interposed between the mechanical splice 5 and the partition wall 7g and biases the mechanical splice 5 and the ferrule 6 connected thereto forward. Accordingly, the mechanical splice 5 is accommodated in the connecting portion accommodation portion 7c of the inner housing 7 in a state where the mechanical splice 5 can move along the longitudinal direction D1. The internal space 7b, which is a bending space for the optical fiber C1, extends from a hole 7s formed inside the protrusion 7h to the guide portion 7d. The curved face 7f of the guide portion 7d spreads in a conical shape from the partition wall 7g. For example, the shape of the curved face 7f viewed along the height direction D2 and the shape of the curved face 7f viewed along the width direction D3 are arc-shaped.

Figure 4:
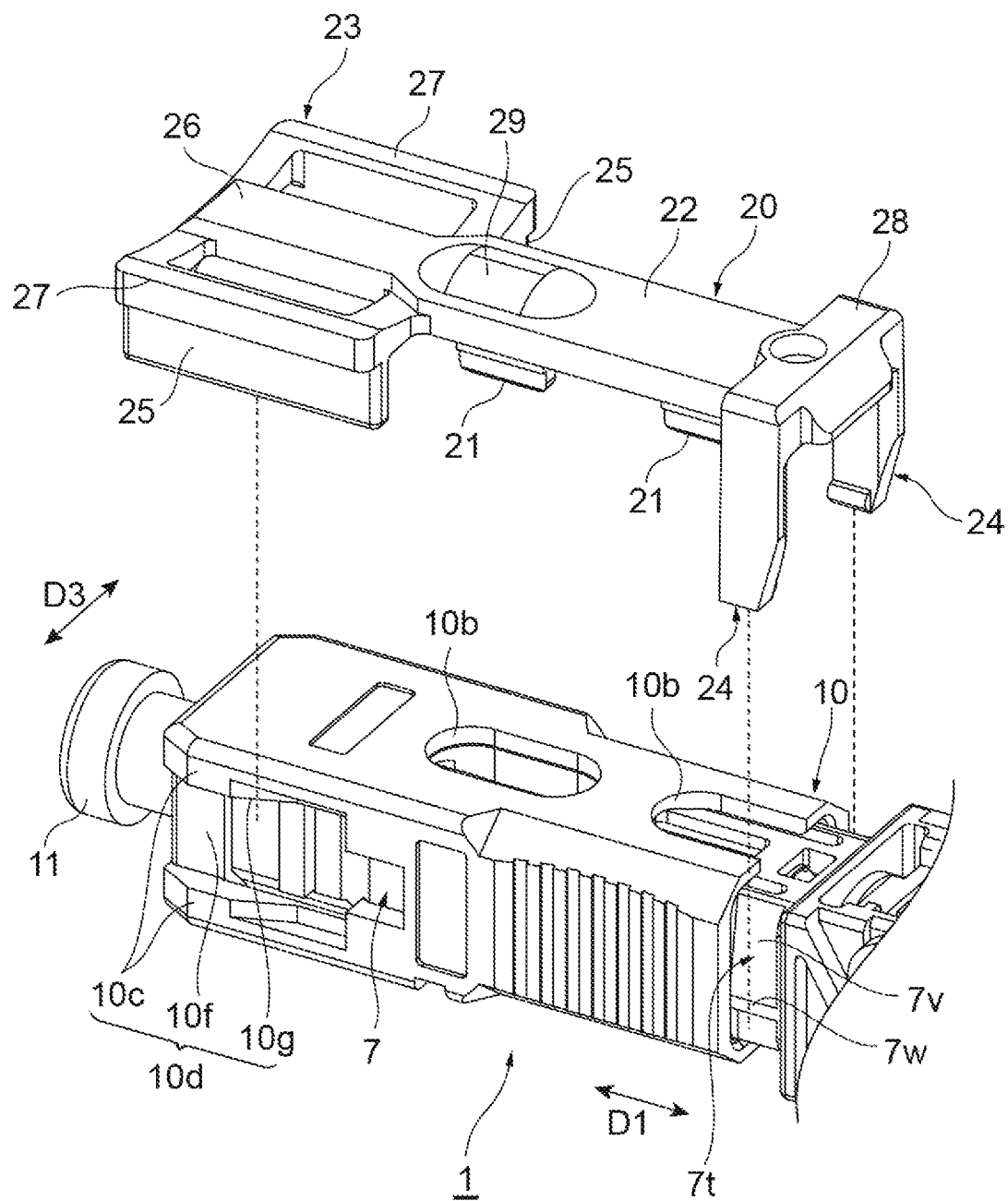
FIG. 4 is a perspective view illustrating the optical fiber connecting jig and the housing of the optical connector in FIG. 1.
Figure 5:
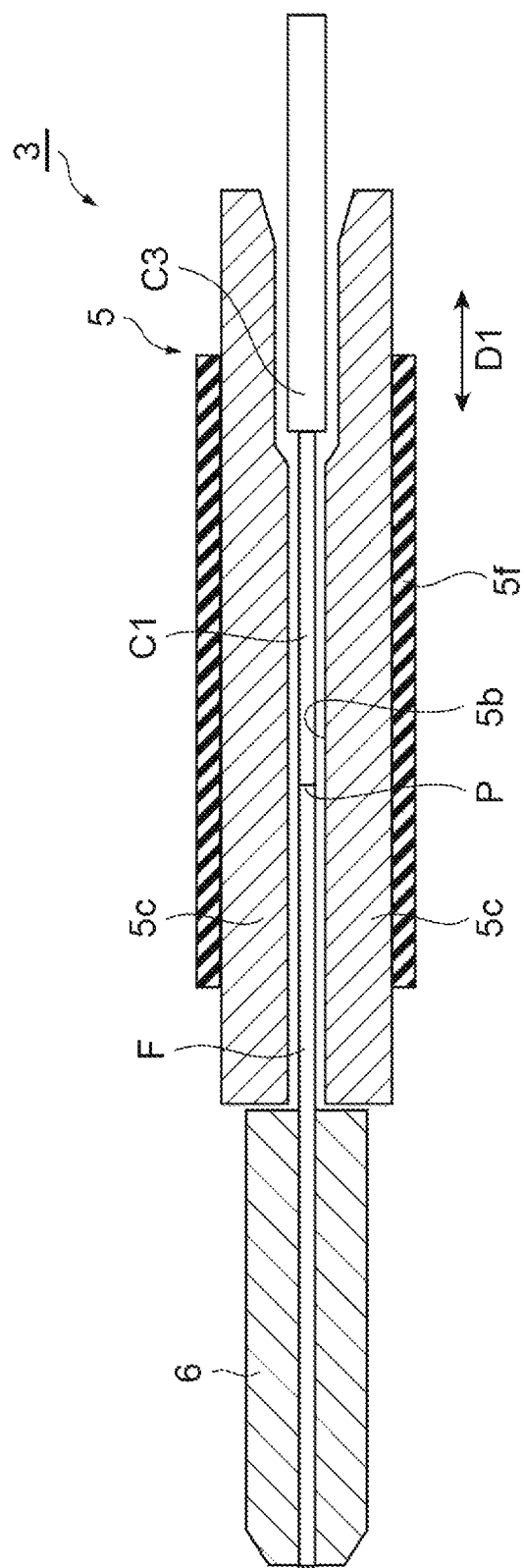
FIG. 5 is a cross-sectional view schematically illustrating a mechanical splice, a ferrule, a built-in fiber, and an optical fiber extending from a cable of the optical connector of FIG. 1.

FIG. 4 is a perspective view illustrating the outer housing 10 and the optical fiber connecting jig 20. FIG. 5 is a cross-sectional view schematically illustrating the optical fiber connecting portion 3 including the mechanical splice 5 and the ferrule 6 located inside the outer housing 10. As illustrated in FIGS. 4 and 5, in a case where the wedge portion 21 of the optical fiber connecting jig 20 is inserted into the through-hole 10b of the outer housing 10, the optical fiber arrangement space 5b is widened.

A built-in fiber F is held inside the ferrule 6 and in the optical fiber arrangement space 5b of the mechanical splice 5. That is, the built-in fiber F is provided inside the ferrule 6 in advance. The mechanical splice 5 connects the built-in fiber F and the optical fiber C1 to each other. A connecting portion P between the optical fiber C1 and the built-in fiber F is located, for example, below the wedge portion 21 on the front side (on the ferrule 6 side).

Figure 6:
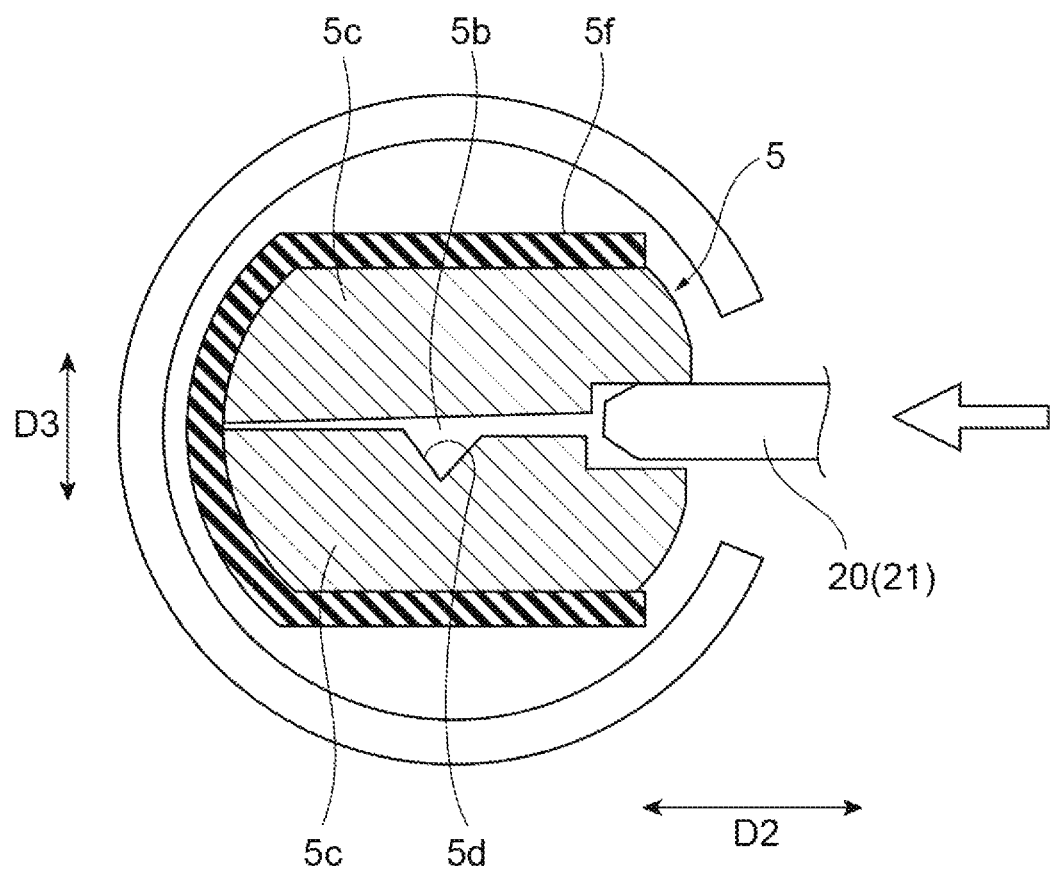
FIG. 6 is a diagram schematically illustrating a state in which a wedge portion is inserted into the mechanical splice of FIG. 5.

The wedge portion 21 of the optical fiber connecting jig 20 inserted through the through-hole 10b of the outer housing 10 enters between the pair of holding members 5c. Accordingly, the optical fiber arrangement space 5b is press-expanded. For example, as schematically illustrated in FIG. 6, the wedge portion 21 of the optical fiber connecting jig 20 is inserted into the mechanical splice 5 in advance. That is, until the optical connector 1 is transported to the site of the connection work, the wedge portion 21 of the optical fiber connecting jig 20 is in a state of press-expanding the optical fiber arrangement space 5b in advance.

Figure 7:
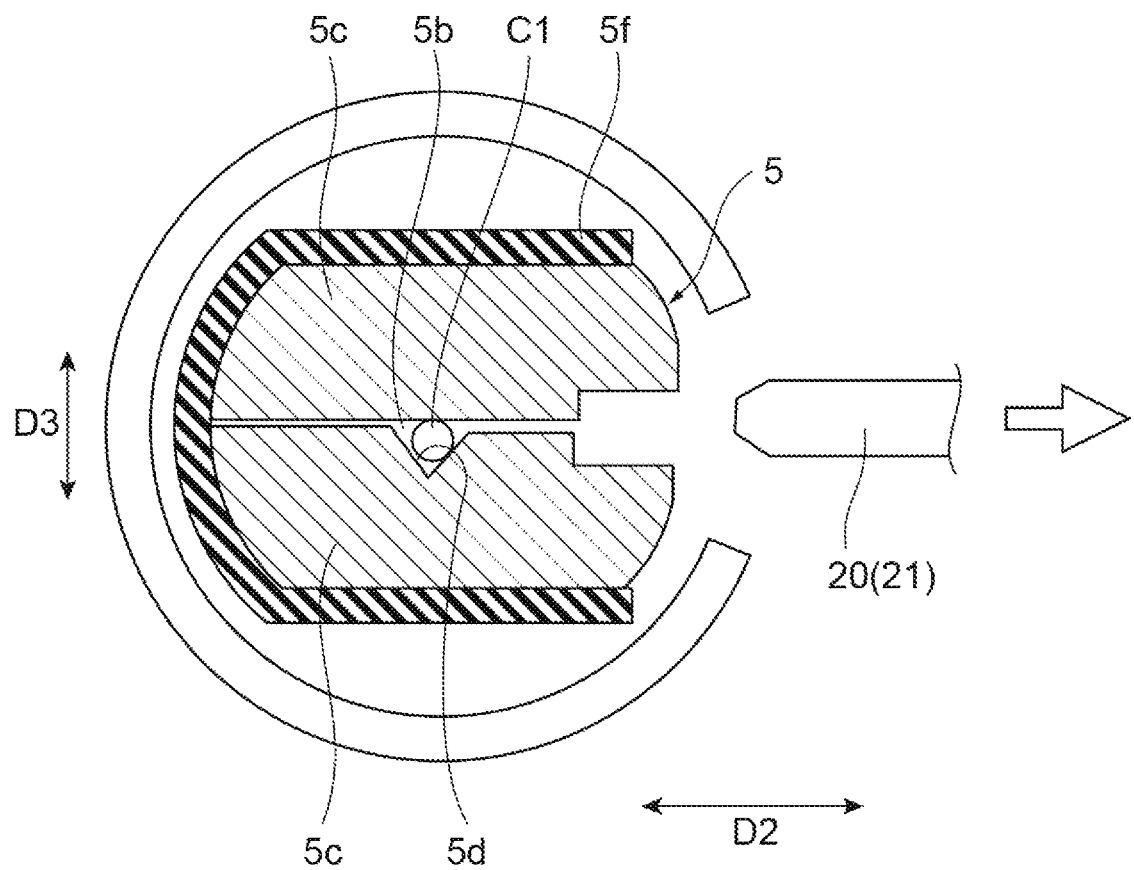
FIG. 7 is a diagram schematically illustrating a state in which a wedge portion is extracted from the mechanical splice of FIG. 6.

As illustrated in FIGS. 6 and 7, the optical fiber C1 from the optical cable C is inserted into the optical fiber arrangement space 5b, and after the optical fiber C1 is connected to the built-in fiber F, when the optical fiber connecting jig 20 is removed, the optical fiber arrangement space 5b is closed. Then, the optical fiber C1 entering the V-groove 5d together with the built-in fiber F is in a state held by the mechanical splice 5.

Figure 8:
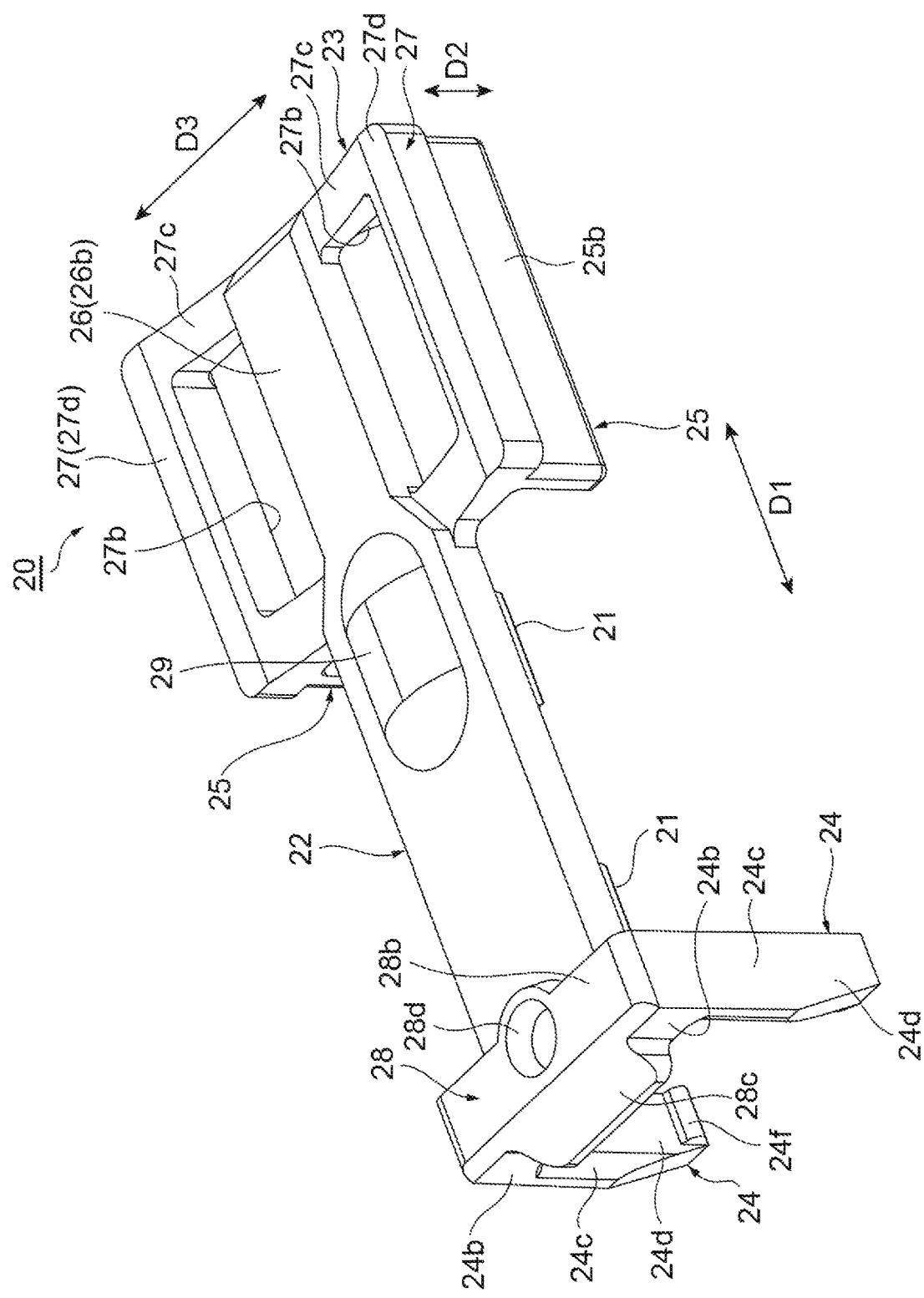
FIG. 8 is a perspective view illustrating an optical fiber connecting jig according to the embodiment.

FIG. 8 is a perspective view illustrating the optical fiber connecting jig 20. As illustrated in FIG. 8, the optical fiber connecting jig 20 includes a base 22, an operation portion 23 operated when the optical fiber connecting jig 20 is pulled out, and a pair of first engagement portions 24 and a pair of second engagement portions 25 engaged with the optical connector 1. The wedge portion 21 and the base 22 are made of, for example, a transparent resin. The entire optical fiber connecting jig 20 may be made of a transparent resin. The base 22 is a plate-shaped portion extending along the longitudinal direction D1 along which the optical fiber C1 and the built-in fiber F extend. The base 22 has a plate shape having a width in the width direction D3 and a thickness in the height direction D2.

Figure 9:
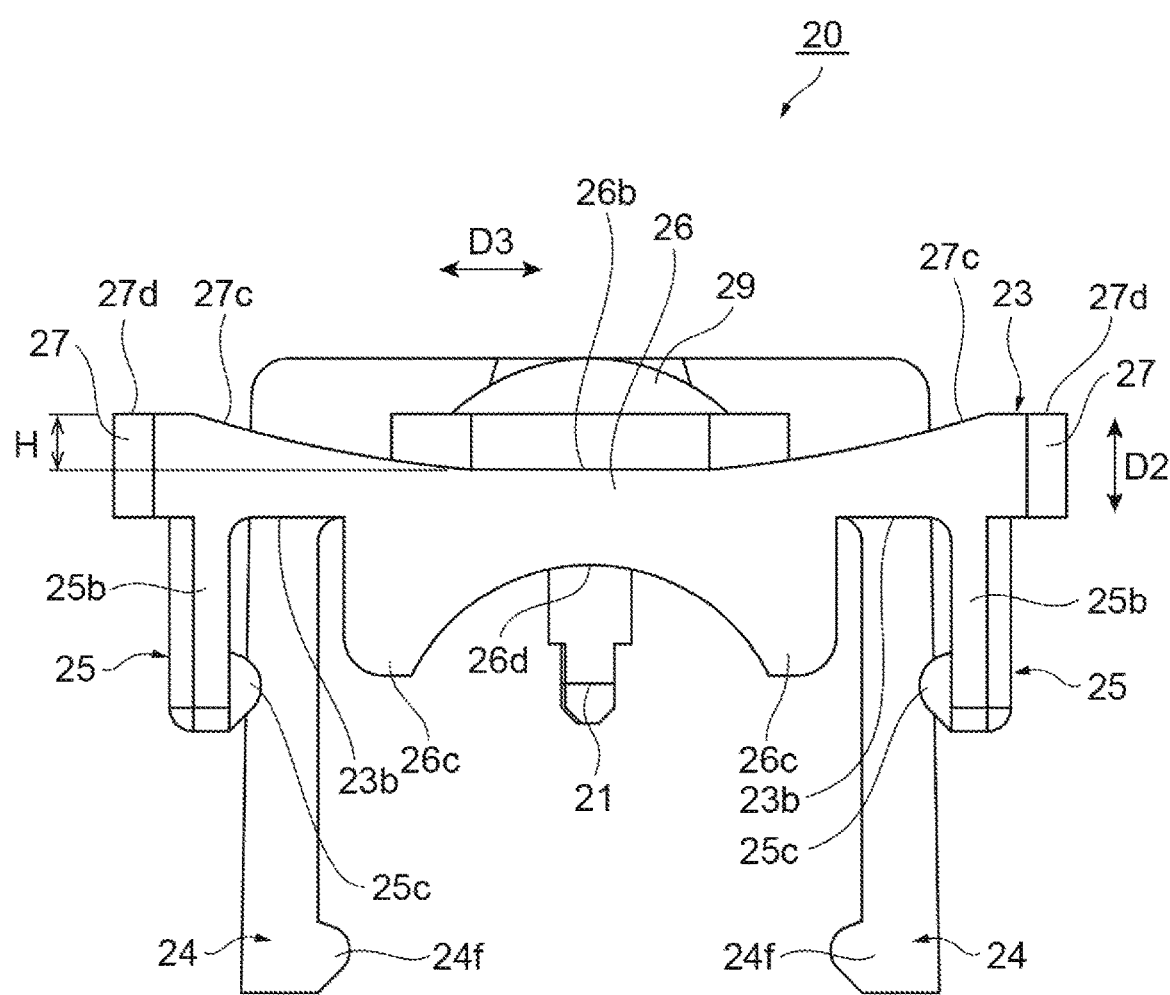
FIG. 9 is a side view of the optical fiber connecting jig in FIG. 8 as viewed from one side in the longitudinal direction.

FIG. 9 is a front view of the optical fiber connecting jig 20 as viewed from the front side. As illustrated in FIGS. 1, 8, and 9, the operation portion 23 is located on the front side (end side in the longitudinal direction D1 of the optical connector 1). The operation portions 23 are provided respectively on both sides of the base 22 in the width direction D3. The operation portion 23 protrudes from the optical connector 1 in the width direction D3. The operation portion 23 has a central portion 26 located at the center of the optical fiber connecting jig 20 in the width direction D3, and both ends 27 respectively located at both end sides of the central portion 26 in the width direction D3.

The central portion 26 is provided on the extension of the base 22 in the longitudinal direction D1. That is, the central portion 26 corresponds to a portion protruding forward from the base 22. The central portion 26 has, for example, a flat face 26b directed upward and a pair of convex portions 26c protruding downward and aligned side by side along the width direction D3. A concave portion 26d, for example, recessed upward in an arc shape is formed between the pair of convex portions 26c.

The both ends 27 have through-holes 27b penetrating in the height direction D2. Due to the through-holes 27b, the weight of the operation portion 23 is reduced, and the both ends 27 can be easily bent upward with a finger or the like. The two ends 27 have inclined faces 27c inclined obliquely upward from the central portion 26 toward both end sides in the width direction D3 and top faces 27d located at the ends of the respective inclined faces 27c on both end sides in the width direction D3. The inclined face 27c is, for example, a curved face gradually rising toward both end sides in the width direction D3. The top face 27d is, for example, a flat face.

The height H of both ends 27 of the operation portion 23 in the width direction D3 relative to the base 22 is larger than the height of the central portion 26 of the operation portion 23 relative to the base 22. The height of the central portion 26 is, for example, the same as the height of the upper face of the base 22. Since the both ends 27 are higher than the central portion 26 with respect to the upper face of the base 22, each of the both ends 27 can be easily bent upward with respect to the central portion 26. The thickness of both ends 27, that is, the length in the height direction D2, increases toward both end sides in the width direction D3, and thus, in this point, the both ends 27 can easily bent upward.

The first engagement portion 24 is located on one side (for example, the rear side) of the base 22 in the longitudinal direction D1. As illustrated in FIG. 4, the first engagement portion 24 is engaged with a side portion 7t of the inner housing 7 facing outward in the width direction D3. For example, the side portion 7t includes a flat face 7v and a convex portion 7w protruding from the flat face 7v in the width direction D3, and the first engagement portion 24 is engaged with the lower face of the convex portion 7w.

Figure 10:
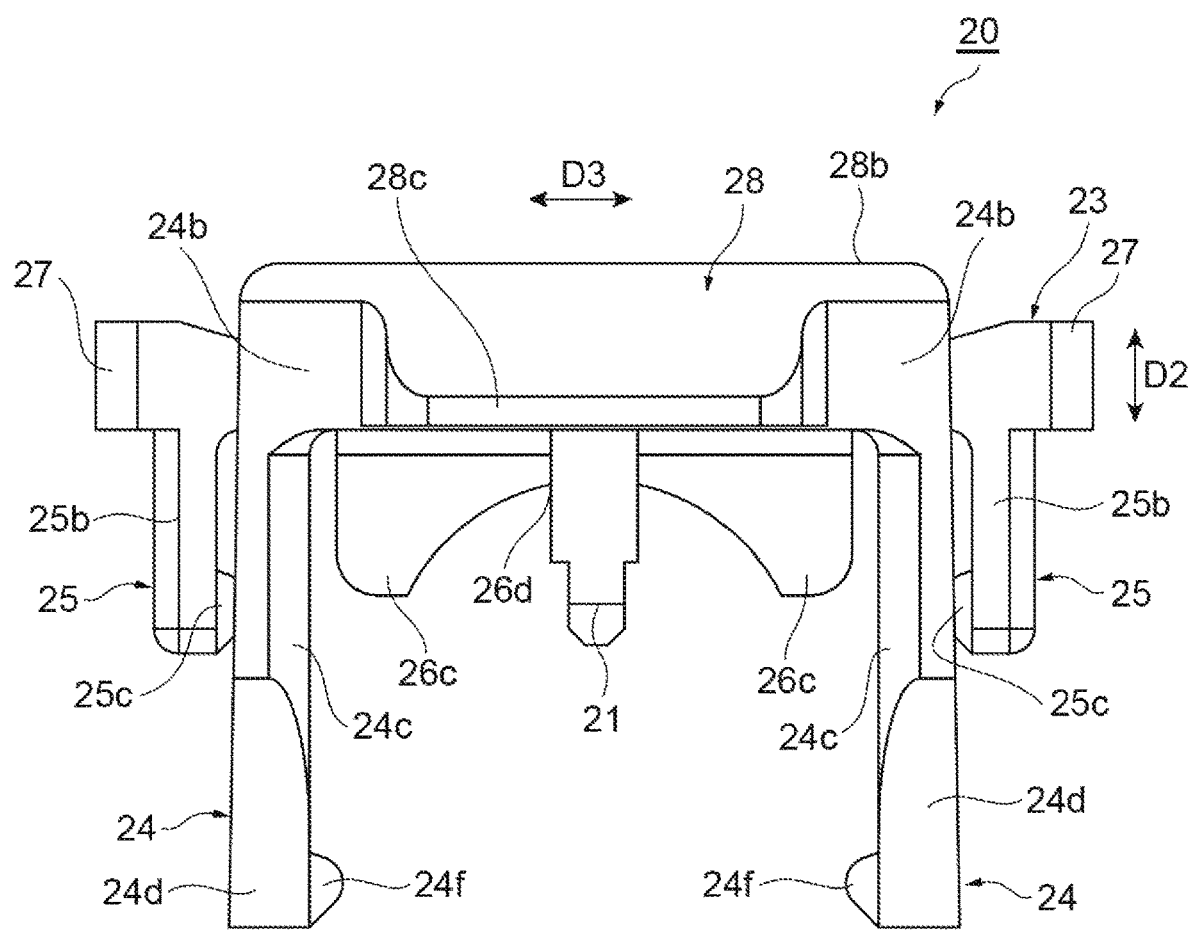
FIG. 10 is a side view of the optical fiber connecting jig in FIG. 8 as viewed from the other side in the longitudinal direction.

FIG. 10 is a rear view of the optical fiber connecting jig 20 as viewed from the rear side. As illustrated in FIGS. 8 and 10, the pair of first engagement portions 24 are aligned side by side along the width direction D3. For example, the optical fiber connecting jig 20 includes a connecting portion 28 that connects the pair of first engagement portions 24 to each other. The connecting portion 28 includes a convex portion 28b protruding upward at the rear of the base 22, a protrusion portion 28c protruding rearward in a region including the center of the convex portion 28b in the width direction D3, and a hole portion 28d being recessed in the convex portion 28b. The upper face of the convex portion 28b is, for example, a flat face, and the protrusion portion 28c extends obliquely downward from the convex portion 28b. For example, the hole portion 28d is circular.

The first engagement portions 24 are provided respectively at both ends of the connecting portion 28 in the width direction D3. The first engagement portion 24, for example, becomes smaller as it goes downward, and a convex portion 24f is formed at the lower end of the first engagement portion 24. The first engagement portion 24 includes, for example, a root portion 24b located on both end sides of the connecting portion 28 in the width direction D3, a first plate-shaped portion 24c extending downward from the root portion 24b, and a second plate-shaped portion 24d extending downward from the first plate-shaped portion 24c. The width of the second plate-shaped portion 24d in the longitudinal direction D1 is decreased as it goes downward.

The convex portion 24f protruding inward in the width direction D3 is formed inside the second plate-shaped portion 24d in the width direction D3. The first engagement portion 24 is engaged with the side portion 7t of the inner housing 7 by allowing the upper face of the convex portion 24f to come into contact with the lower face of the convex portion 7w of the inner housing 7. As an example, the convex portion 24f has a curved face, and the convex portion 24f extends in the longitudinal direction D1. Since the convex portion 24f has a curved face, the first engagement portion 24 can be pulled out from the optical connector 1 with a relatively weak force.

The second engagement portion 25 is located on the other side (for example, the front side) of the base 22 in the longitudinal direction D1. As illustrated in FIG. 4, the second engagement portion 25 is engaged with the outer housing 10. For example, the outer housing 10 has a side portion 10d facing outward in the width direction D3. The side portion 10d includes a pair of convex portions 10c aligned side by side along the height direction D2, a concave portion 10f formed between the pair of convex portions 10c, and an opening 10g exposing the inner housing 7 in the rear side of the concave portion 10f. The second engagement portion 25 is engaged with the lower face of the upper convex portion 10c out of the pair of convex portions 10c facing outward of the outer housing 10 in the width direction D3.

As illustrated in FIGS. 8 and 9, a pair of second engagement portions 25 are provided to be aligned side by side along the width direction D3. The second engagement portions 25 are provided respectively, for example, on both end sides of the operation portion 23 in the width direction D3. Specifically, the second engagement portion 25 protrudes downward from the lower face 23b of the operation portion 23 located on both end sides of the convex portion 26c of the central portion 26 in the width direction D3 in the operation portion 23. The second engagement portions 25 are provided at locations near both ends on the lower face 23b in the width direction D3, and the operation portions 23 protrude from the second engagement portions 25 to both end sides in the width direction D3.

For example, the length of the second engagement portion 25 in the height direction D2 is smaller than the length of the first engagement portion 24 in the height direction D2. As an example, the second engagement portions 25 are provided on both end sides in the width direction D3 relative to the first engagement portions 24. The second engagement portion 25, for example, extends in a linear shape downward from the operation portion 23, and a convex portion 25c is formed at the lower end of the second engagement portion 25. The second engagement portion 25 includes, for example, a plate-shaped portion 25b extending downward from the lower face 23b of the operation portion 23 and the convex portion 25c protruding inward in the width direction D3 at the lower end of the plate-shaped portion 25b.

The second engagement portion 25 is engaged with the side portion 10d of the outer housing 10 by allowing the upper face of the convex portion 25c to come into contact with the lower face of the convex portion 10c of the outer housing 10. As an example, the convex portion 25c has a curved face shape, and the convex portion 25c extends in the longitudinal direction D1. Since the convex portion 25c has a curved face shape, the second engagement portion 25 can be pulled out from the optical connector 1 with a relatively weak force.

As illustrated in FIGS. 4 and 5, the optical fiber connecting jig 20 includes a pair of the wedge portions 21 aligned side by side along the longitudinal direction D1. For example, out of the pair of wedge portions 21, the wedge portion 21 located on the side of the first engagement portion 24 press-expands the optical fiber arrangement space 5b through which a coat C3 of the optical fiber C1 passes. On the other hand, out of the pair of wedge portions 21, the wedge portion 21 located on the side of the second engagement portion 25 press-expands the optical fiber arrangement space 5b at the connecting portion P where the optical fiber C1 is connected to the built-in fiber F.

The optical fiber connecting jig 20 has a convex lens 29 protruding from the base 22 to the opposite side of the wedge portion 21. The convex lens 29 is located above the wedge portion 21 that press-expands the optical fiber arrangement space 5b of the connecting portion P. For example, the wedge portion 21 and the convex lens 29 are made of a transparent resin. Therefore, when light leaks from the connecting portion P, since the light reaches the convex lens 29 via the wedge portion 21, the leakage of the light from the connecting portion P can be confirmed by visually recognizing the light emitted from the convex lens 29.

Next, the functions and effects of the optical fiber connecting jig 20 and the optical connector 1 according to this embodiment will be described. The optical fiber connecting jig 20 includes first engagement portions 24 provided respectively on both sides of the base 22 in the width direction D3 on one side of the base 22 in the longitudinal direction D1 and second engagement portions 25 provided respectively on both sides of the base 22 in the width direction D3 on the other side of the base 22 in the longitudinal direction D1. Therefore, the base 22 is engaged with the optical connector 1 on one side and the other side of the base 22 in the longitudinal direction D1 and on one side and the other side of the base 22 in the width direction D3, respectively. As a result, the optical fiber connecting jig 20 can be prevented from falling off from the optical connector 1.

Even when vibrations or impacts are applied due to engagement of each of the four engagement portions (the pair of first engagement portions 24 and the pair of second engagement portions 25) of the optical fiber connecting jig 20 with the optical connector 1, the optical fiber connecting jig 20 can be allowed not to be likely to fall off. The optical fiber connecting jig 20 includes the operation portion 23 protruding from the optical connector 1 to both sides in the width direction D3. Therefore, the optical fiber connecting jig 20 can be removed in one action by performing the operation of picking the operation portions 23 protruding on both sides in the width direction D3 and pulling up the optical fiber connecting jig 20 from the optical connector 1. Therefore, the operability of the operation of removing the optical fiber connecting jig 20 can be improved.

Each of the pair of first engagement portions 24 may be engaged with the inner housing 7 accommodating the mechanical splice 5. Each of the pair of second engagement portions 25 may be engaged with the outer housing 10 accommodating the inner housing 7. In this case, the portion of the optical connector 1 with which the first engagement portion 24 is engaged can be allowed to be different from the portion with which the second engagement portion 25 is engaged.

The height H of both ends 27 of the operation portion 23 in the width direction D3 relative to the base 22 may be larger than the height of the central portion 26 of the operation portion 23 relative to the base 22 in the width direction D3. In this case, since the height H of the pair of both ends 27 of the operation portion 23 is larger than the height of the central portion 26, the pair of both ends 27 can be picked, and the operation portion 23 can be more easily pulled up. Therefore, the operability of pulling out the optical fiber connecting jig 20 can be further improved.

The position of the operation portion 23 in the longitudinal direction D1 may coincide with the end on the side of the connecting portion P where the optical fiber C1 and the built-in fiber F are connected to each other. In this case, the operation portion 23 is provided at a position closer to the connecting portion P. Therefore, when the optical fiber connecting jig 20 is pulled up from the optical connector 1 by the operation portion 23, the optical fiber C1 and the built-in fiber F can be connected immediately in the connecting portion P. That is, when the operation portion 23 is pulled up, since the wedge portion 21 on the side (front side) of the connecting portion P is pulled out before the wedge portion 21 on the rear side, the connecting portion P can be fixed first. Therefore, the glass fibers of the optical fiber C1 and the built-in fiber F can be fixed in advance.

At least a portion of the base 22 and the wedge portion 21 may be made of a transparent resin. In this case, the optical connector 1 can be visually recognized through the base 22 and the wedge portion 21, and the connection state of the optical fiber C1 and the built-in fiber F can be confirmed by the light leaked from the connecting portion P.

The optical fiber connecting jig 20 may include a convex lens 29 protruding from the base 22 to the opposite side of the wedge portion 21. In this case, since the light leaked from the connecting portion P between the optical fiber C1 and the built-in fiber F can be increased by the convex lens 29, the confirmation of the connection state can be more easily performed.

The optical connector 1 may include the optical fiber connecting jig 20 and the mechanical splice 5, and the wedge portion 21 of the optical fiber connecting jig 20 may be inserted. In this case, the optical fiber connecting jig 20 is attached to the optical connector 1. Therefore, the optical fiber connecting jig 20 cannot be required to be provided at the site of the connection work. Therefore, the connection work for the optical fiber C1 of the optical cable C to the optical connector 1 can be more easily performed.

Heretofore, the embodiments of the optical fiber connecting jig and the optical connector according to the present disclosure have been described above. However, the invention is not limited to the embodiments described above. That is, it is easily understood by those skilled in the art that the present invention can be modified and changed in various ways within the scope of the spirit described in the claims. For example, the shape, size, number, material, and layout of each portion of the optical fiber connecting jig and optical connector can be changed as appropriate within the scope of the above-described spirit.

For example, in the above-described embodiment, the case where the first engagement portion 24 is engaged with the lower face of the convex portion 7w of the inner housing 7, and the second engagement portion 25 is engaged with the lower face of the upper convex portion 10c among the pair of convex portions 10c facing the outer side of the outer housing 10 in the width direction D3 has been described. However, for example, the first engagement portion may be engaged to hold the entire inner housing 7, and the second engagement portion may be engaged to hold the entire outer housing 10. The first engagement portion and the second engagement portion may be engaged to hold the entire optical connector. In this manner, the location of the target engaged with the first engagement portion and the location of the target engaged with the second engagement portion are not particularly limited.

REFERENCE SIGNS LIST

1: optical connector, 3: optical fiber connecting portion, 4: spring, 5: mechanical splice, 5b: optical fiber arrangement space, 5c: holding member, 5d: V-groove, 5f: clamp, 6: ferrule, 7: inner housing, 7b: internal space, 7c: connecting portion accommodation portion, 7d: guide portion, 7f: curved face, 7g: partition wall, 7h: protrusion, 7s: hole, 7t: side portion, 7v: flat face, 7w: convex portion, 8: rear cover, 8b: shaft portion, 9: outer sheath fixing portion, 10: outer housing, 10b: through-hole, 10c: convex portion, 10d: side portion, 10f: concave portion, 10g: opening, 11: ferrule cap, 20: optical fiber connecting jig, 21: wedge portion, 22: base, 23: operation portion, 23b: lower face, 24: first engagement portion, 24b: root portion, 24c: first plate-shaped portion, 24d: second plate-shaped portion, 24f: convex portion, 25: second engagement portion, 25b: plate-shaped portion, 25c: convex portion, 26: central portion, 26b: flat face, 26c: convex portion, 26d: concave portion, 27: both ends, 27b: through-hole, 27c: inclined face, 27d: top face, 28: connecting portion, 28b: convex portion, 28c: protrusion portion, 28d: hole, 29: convex lens, C: optical cable, C1: optical fiber, C2: outer sheath, C3: coat, D1: longitudinal direction, D2: height direction, D3: width direction, F: built-in fiber, P: connecting portion.

The invention claimed is:

1. An optical fiber connecting jig used in an optical connector having a mechanical splice connecting an optical fiber and a built-in fiber to each other, the optical fiber connecting jig comprising:
   a plate-shaped base extending in a direction of extension of the optical fiber and the built-in fiber and mounted on the optical connector so as to cover the optical connector;
   a wedge portion protruding from the base and inserted into the mechanical splice;
   operation portions provided respectively on both sides of the base in a width direction and protruding in the width direction from the optical connector;
   a pair of first engagement portions provided respectively on both sides of the base in the width direction on one side of the base in the longitudinal direction and protruding toward the optical connector; and
   a pair of second engagement portions provided respectively on both sides of the base in the width direction on the other side of the base in the longitudinal direction and protruding toward the optical connector, wherein
   the operation portions protrude from the base in the width direction at the other side of the base in the longitudinal direction.

2. The optical fiber connecting jig according to claim 1, wherein each of the pair of first engagement portions is engaged with an inner housing accommodating the mechanical splice, and wherein each of the pair of second engagement portions is engaged with an outer housing accommodating the inner housing.

3. The optical fiber connecting jig according to claim 1, wherein a height of the operation portion at both ends in the width direction relative to the base is larger than a height of a central portion of the operation portion in the width direction relative to the base.

4. The optical fiber connecting jig according to claim 1, wherein the operation portion is located in a portion of the base near a connecting portion where the optical fiber and the built-in fiber are connected to each other.

5. The optical fiber connecting jig according to claim 1, wherein at least a portion of the base and the wedge portion is made of a transparent resin.

6. The optical fiber connecting jig according to claim 5, wherein a convex lens protrudes from the base to an opposite side of the wedge portion.

7. An optical connector comprising the optical fiber connecting jig and the mechanical splice according to claim 1,
wherein the wedge portion of the optical fiber connecting jig is inserted into the mechanical splice.

\* \* \* \* \*